United States Patent
Lim et al.

(10) Patent No.: US 8,576,781 B2
(45) Date of Patent: *Nov. 5, 2013

(54) FEMTOCELL ARCHITECTURE IN SUPPORT OF VOICE AND DATA COMMUNICATIONS

(75) Inventors: Heeseon Lim, Cupertino, CA (US); Nishi Kant, San Jose, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,331

(22) Filed: Feb. 10, 2012

(65) Prior Publication Data
US 2013/0017831 A1  Jan. 17, 2013

Related U.S. Application Data

(63) Continuation of application No. 12/250,947, filed on Oct. 14, 2008, now Pat. No. 8,116,264.

(51) Int. Cl.
*H04W 4/00* (2009.01)

(52) U.S. Cl.
USPC .......................................... 370/328

(58) Field of Classification Search
None
See application file for complete search history.

(56) References Cited

U.S. PATENT DOCUMENTS

| | | | |
|---|---|---|---|
| 7,324,483 B2 | 1/2008 | Lee | |
| 8,116,264 B2* | 2/2012 | Lim et al. | 370/328 |
| 2006/0104258 A1 | 5/2006 | Lee et al. | |
| 2007/0243872 A1* | 10/2007 | Gallagher et al. | 455/436 |
| 2008/0181204 A1 | 7/2008 | Gallagher et al. | |
| 2008/0305793 A1 | 12/2008 | Gallagher et al. | |

* cited by examiner

*Primary Examiner* — Anh-Vu Ly

(74) *Attorney, Agent, or Firm* — DLA Piper LLP; Blake W. Jackson

(57) ABSTRACT

Methods and systems for providing voice and date services in a femtocell wireless network. The proposed approach integrates IWLAN architecture into femtocell architecture by introducing a gateway to serve both IWLAN and femtocell users. The proposed approach handles the voice and data in a different way so that it enhances the data handling efficiency while re-using existing MSC investment. The proposed approach carries the data traffic from a femtocell base station to the gateway in native IP packet, instead of encapsulating them in 3G data, thus enhancing the efficiency and performance for the data traffic. The data traffic can then be sent to GGSN or directly to packet data network. The approach tunnels voice traffic to MSC through the gateway as in conventional Iu-CS approach.

8 Claims, 4 Drawing Sheets

FEMTOCELL ARCHITECTURE IN SUPPORT OF VOICE AND DATA COMMUNICATIONS

CROSS-REFERENCE TO OTHER APPLICATION

This application is a continuation of U.S. patent application Ser. No. 12/250,947 filed on Oct. 14, 2008 now U.S. Pat. No. 8,116,264.

FIELD OF THE INVENTION

The present application relates to voice and data communications in wireless networks, and more particularly to the support of efficient data communications in a radio access network with femtocell base stations.

BACKGROUND OF THE INVENTION

Note that the points discussed below may reflect the hindsight gained from the disclosed inventions, and are not necessarily admitted to be prior art. Increasing number of people want to use mobile phones for both voice and data services. They want to access those services wherever they are, including in their home residences. However, to provide full and sufficient mobile coverage is always challenging for the mobile operators, and many times the mobile coverage in the home may be poor. To provide better coverage, the mobile operators need to add more base stations, which may not be economical due to the high cost of the base station and the revenue that it generate in the coverage area.

To solve this problem, the industry has introduced the concept of a femtocell. Originally called an access point base station—a scalable, multi-channel, two-way communication device extending a typical base station by incorporating all of the major components of the telecommunications infrastructure. Application of VoIP techniques allows such a unit to provide voice and data services in the same way as a normal base station, but with the deployment simplicity of a Wi-Fi access point.

A cheap, small capacity femtocell base station can be installed in a subscriber's home. Femtocell base stations provide full 3G base stations with low transmission power and use an already-existing fixed line as the backhaul path, saving the cost from the expensive ATM backhaul. Since it is using the 3G base station technology, a femtocell base station allows the existing handsets to work without any changes, e.g. without the support of Wi-Fi at the handsets. In summary, femtocells extend the mobile coverage to residential homes and replace the expensive backhaul link with cheap broadband connection, without the need to modify the handsets.

In the radio access network, the governing element is a radio network controller RNC that is responsible for radio resource management. The RNC connects to a circuit-switched core network through a media gateway (MOW) and to an SGSN (serving GPRS (general packet radio service) support node). The logic connections between the network elements, known as interfaces, are shown in FIG. 1. The interface between the RNC and the circuit switched core network (CS-CN) is called Iu-CS and between the RNC and the packet switched core network is called Iu-PS. Other interfaces include Iub, an interface between the RNC and the node-B and Iur, an interface between RNCs in the same network. Iu interfaces carry user traffic (such as voice or data) as well as control information, and Iur interface is primarily used for soft handovers.

Since the femtocell device typically contains all the telecommunication elements such as a Node-B, RNC, and Gateway Support Node, GSN with only an Ethernet or broadband connection to the Internet or an intranet, the supporting interfaces need to be encapsulated in IP and transported to suitable entry point in the operator's network.

Several architectures are possible to support femtocell operations, depending on the capability of the femtocell base stations and the corresponding core network node. Several examples are as follows:

Iub over IP: A femtocell base station supports 3G radio base station functionalities and is connected to the radio network control (RNC) node. Iub interface is supported between the femtocell base station and the RNC. This is typically a less open single vendor solution, and usually femtocell base stations and RNCs are bundled.

Iu-CS/Iu-PS over IP: A femtocell base station supports 3G base station and RNC functionalities, and it is connected to the MSC and SGSN in the core network. Iu-CS and Iu-PS interface is supported between femtocell base station and the MSC (mobile switching center) and SGSN, respectively. This configuration has the advantage of reducing one node from the user plane.

SIP (Session Initiation Protocol) method: SIP provides a signaling and call setup protocol for IP-based communications that can support a superset of the call processing functions and features present in the public switched telephone network. In a SIP based femtocell, all the core network functionalities (including RNC, SGSN, and GGSN (Gateway GPRS Support Node (GGSN)) are collapsed into the femtocell base stations, and the femtocell base station terminates all the Non Access Stratum (NAS) messages.

In an SIP based femtocell architecture, pure IP packets are produced from femtocell base stations and all the services are provided via SIP. This architecture provides the framework for all-IP network and services and is a desirable architecture. However, the femtocell base stations need to provide most functionality support for all the services, in particular, the femtocells are required to perform the voice call control to SIP translation for voice traffic.

Even though these mechanisms extend the coverage to residential homes and replace the expensive backhaul with an IP network, they still utilize the 3G signaling (i.e., Iub or Iu-CS/Iu-PS) although enwrapped in IP. The non-IP payload transfer over IP is not an efficient way of handling data applications for the femtocell design.

The reuse of existing radio access network, (RAN) technologies (and potentially re-use of existing frequency channels) could also create problems, since the additional femtocell transmitters represent a large number of interference sources, potentially resulting in significant operational challenges for existing deployments.

Also femtocell technology typically relies on the Internet for connectivity, which although reduces deployment costs but introduces security risks that generally do not exist in typical cellular systems.

A more efficient and secure way of communication interface is needed for the success deployment of femtocell network architecture.

SUMMARY OF THE INVENTION

The present application discloses new approaches to provide a new architecture for the radio access network that uses the femtocell base stations, to enhance the data handling efficiency in terms of protocol and processing overhead without requiring extra burdens or responsibilities on the femtocell base station.

This new architecture utilizes the functionalities of the Tunnel Terminating Gateway (TTG) defined in interworking WLAN (I-WLAN) with 2G/3G system by 3GPP. By incorporating the TTG functionalities into a gateway called Metro-WSG (Metro-Wireless Service Gateway), the data traffic (i.e. the IP traffic) is carried from the femtocell base station to the Metro-WSG in native IP packets, instead of encapsulated in 3G data, which enhances the efficiency and the performance of the data transport.

Further, because the voice traffic is tunneled through TTG without processing, Metro-WSG does not need to add functionality to support voice traffic. Thus, the disclosed solution re-uses the MSC for user traffic (voice or data).

The present disclosure provides one more step towards the all-IP based femtocell architecture, where both voice and data traffic can be handled efficiently at the femtocell base station. In one preferred embodiment, IP packet is sent via IPsec tunnel from the femtocell base station to the Metro-WSG where the voice traffic can still be handled using traditional 2G/3G methods, the femtocell base station does not need to support 2G/3G call control for SIP conversion, saving a huge workload and overhead from the femtocell base stations.

In another preferred embodiment, the disclosed approach integrates IWLAN architecture into femtocell architecture, enabling the Metro-WSG to serve both IWLAN and femtocell users. This provides flexibility and choices to the operators so that the operators can provide both femtocell and IWLAN services using the same core network node (Metro-WSG) maximizing return on the investment in the deployment.

The disclosed innovations, in various embodiments, provide one or more of at least the following advantages:

allowing mobile operators to extend their 3G coverage to the residential homes, with better data handling efficiency;

providing more value to the mobile operators who already provide IWLAN services with TTG in their networks to support the femtocell architecture for handsets without Wi-Fi capability;

allowing IWLAN operators to provide the femtocell services without a large extra investment since the disclosed approaches re-use the TTG to support femtocell architecture, benefiting the femtocell base station vendors, since disclosed approaches simplify the femtocell base station implementation by removing the need to support Iu-PS;

supporting both single-mode and dual-mode handsets;

supporting both IWLAN and femtocell architecture at the same node, and reducing the femtocell base station's development cost and time, which will eventually accelerate the adoption of femtocell architecture in the industry.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to presently preferred embodiments (by way of example, and not of limitation).

Figure 1:
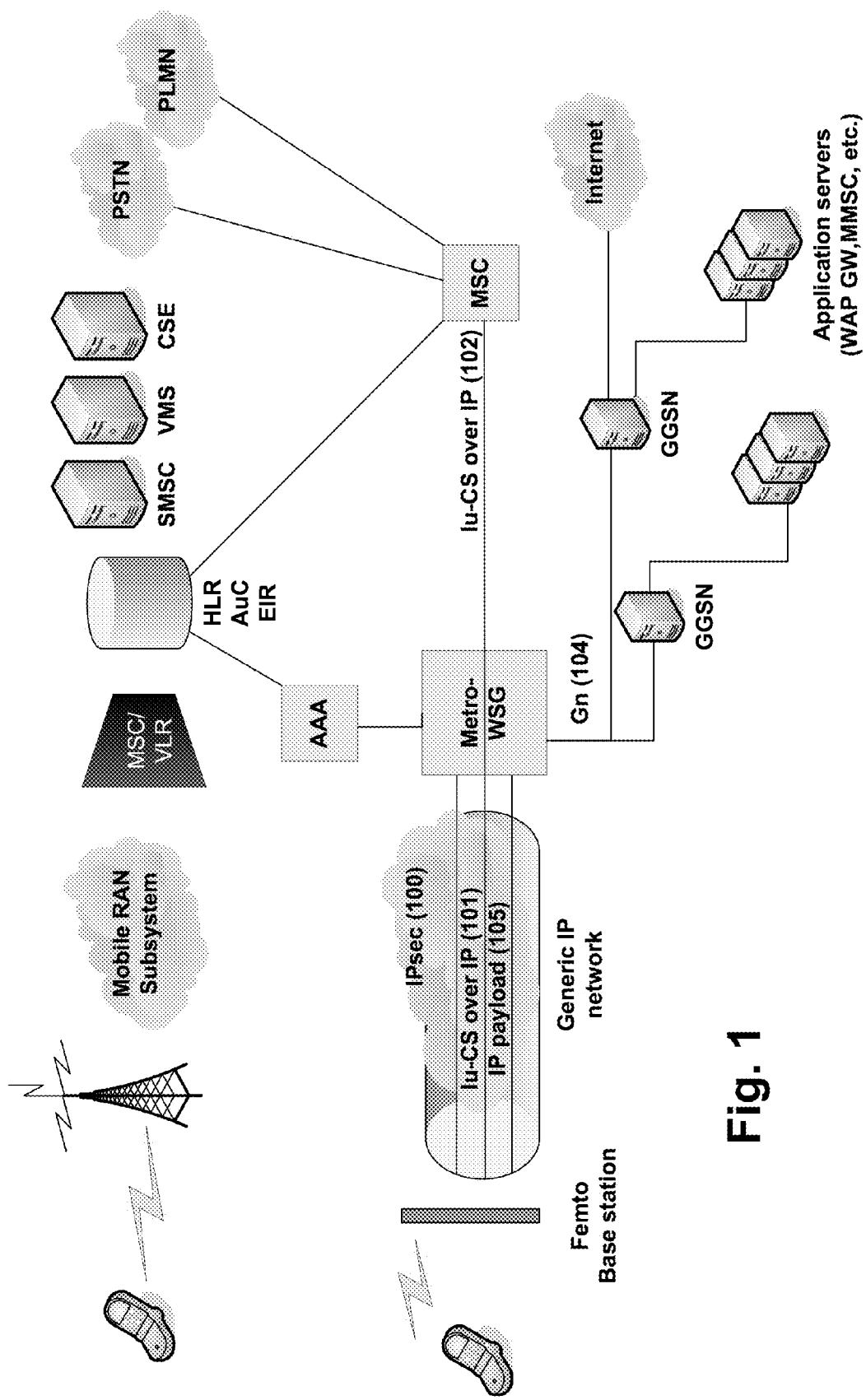
FIG. 1 schematically shows the femtocell architecture with Metro-WSG.

The preferred embodiment of the disclosed innovations provides architecture for femtocell environment where the voice is handled in the operator's MSC as in Iu-CS over IP architecture and the data is handled as simple IP payload, instead of 3G payload. This is accomplished mainly by a set of core network functionalities that provide enhanced tunnel terminating gateway (TTG, as defined in 3GPP IWLAN spec). This set of core network functionalities are implemented at a node called Metro-WSG in this preferred embodiment. FIG. 1 shows the femtocell architecture with Metro-WSG.

In a femtocell architecture, a security gateway is needed since the traffic is sent through a public IP network and the traffic (both data and control) needs to be protected. In general, the security gateway establishes the secure tunnel (i.e. IPsec) with femtocell base station. In the preferred embodiment as shown in FIG. 1, Metro-WSG performs the security gateway role and establishes the IPsec between a femtocell base station and itself as the first step to provide service to the femtocell base station (100).

In the preferred embodiment, the femtocell base station acts as RNC for the voice traffic. Thus, it terminates the Iu-b signaling from the UE and relays the traffic over Iu-CS.

For voice traffic, the Metro-WSG simply acts as security gateway and plays no role in supporting Iu-CS. Therefore, the Iu-CS from the femtocell base station is first tunneled inside IPsec between the femtocell base station and the Metro-WSG (101) (see FIG. 1) and then the Metro-WSG simply forwards the Iu-CS traffic to the MSC (102). This approach ensures that the voice services are supported in the same way as 3G voice services, and no further functionalities (e.g. CC to SIP translation, etc.) are needed at the femtocell base station to support voice services.

For the data traffic, the femtocell acts as RNC towards the UE, and terminates the Iu-b signalling from the UE. However, instead of carrying the IP data payload inside Iu-PS, the femtocell base station simply strips the IP payload and sends it inside IPsec, as pure IP payload (103). The Metro-WSG then encapsulates the IP payload to send it over Gn to GGSN (104). In case the Metro-WSG is working in PDG (Packet data gateway) mode, Metro-WSG can also route the traffic directly to the destination PDN, without encapsulating it over Gn. This approach ensures that the IP data payloads are sent without any further encapsulation or treatment from the femtocell base station, and provides a way to support data services, especially broadband data services, efficiently, thus maximizing the usability of the femtocell architecture which uses IP network as a backhaul.

Figure 2:
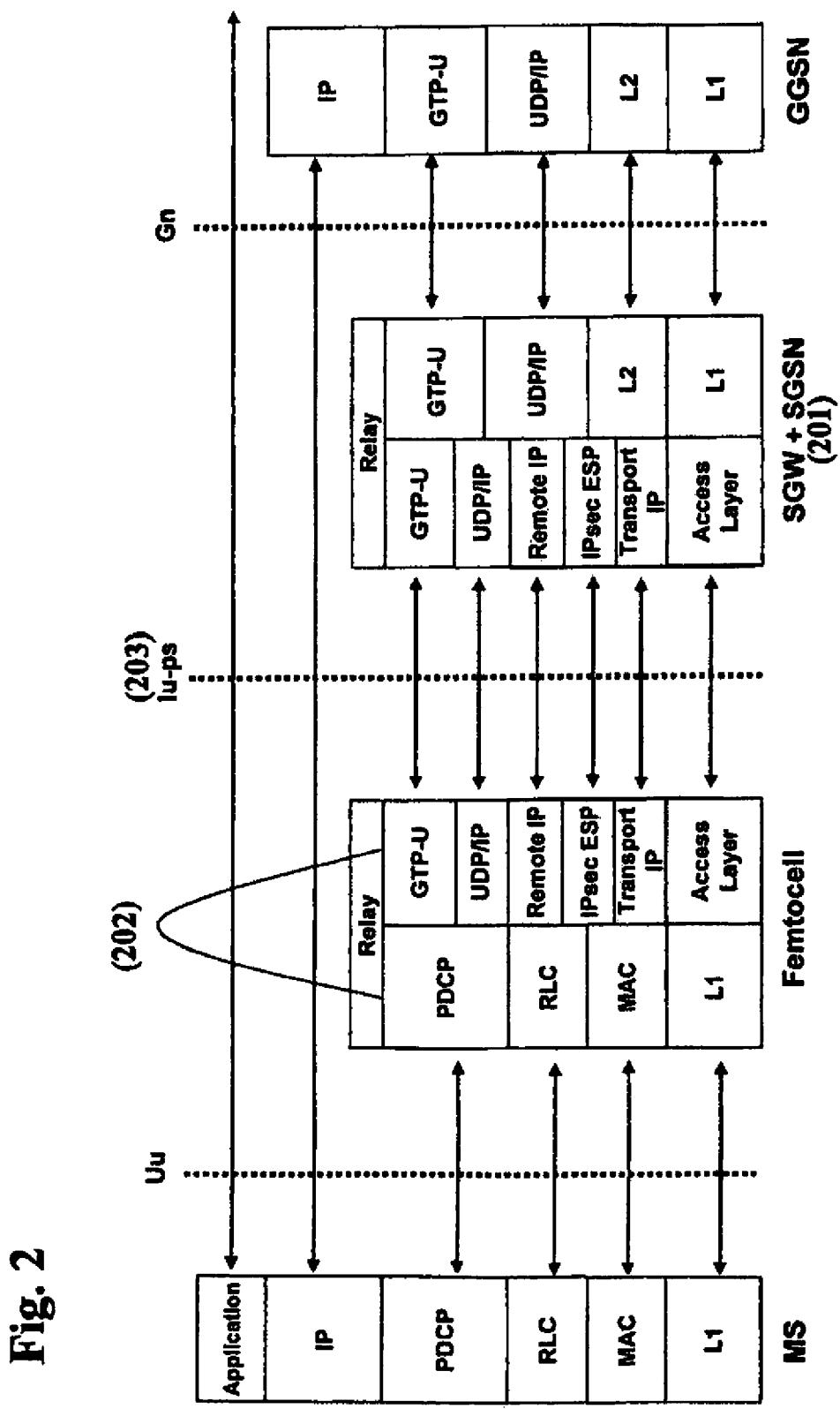
FIG. 2 shows an example of the protocol stack of a conventional femtocell architecture which supports Iu-PS over IP.

FIG. 2 shows the protocol stack of a conventional femtocell architecture which supports Iu-PS over IP. For the simplicity, the security gateway and the SGSN is shown in FIG. 2 as a combined node (201). In case the security gateway is a separate node from the SGSN, the security gateway terminates the IPsec and tunnels the Iu-PS signalling to the SGSN.

In the preferred embodiment, the femtocell base station terminates the radio interface signalling from the UE and relays the payload over Iu-PS. To do this, femtocell base station extracts the IP payload first and then re-encapsulates it into GTP-U (202) and sends it over Iu-PS (203). The femtocell needs to support GTP protocol for this architecture.

Figure 3:
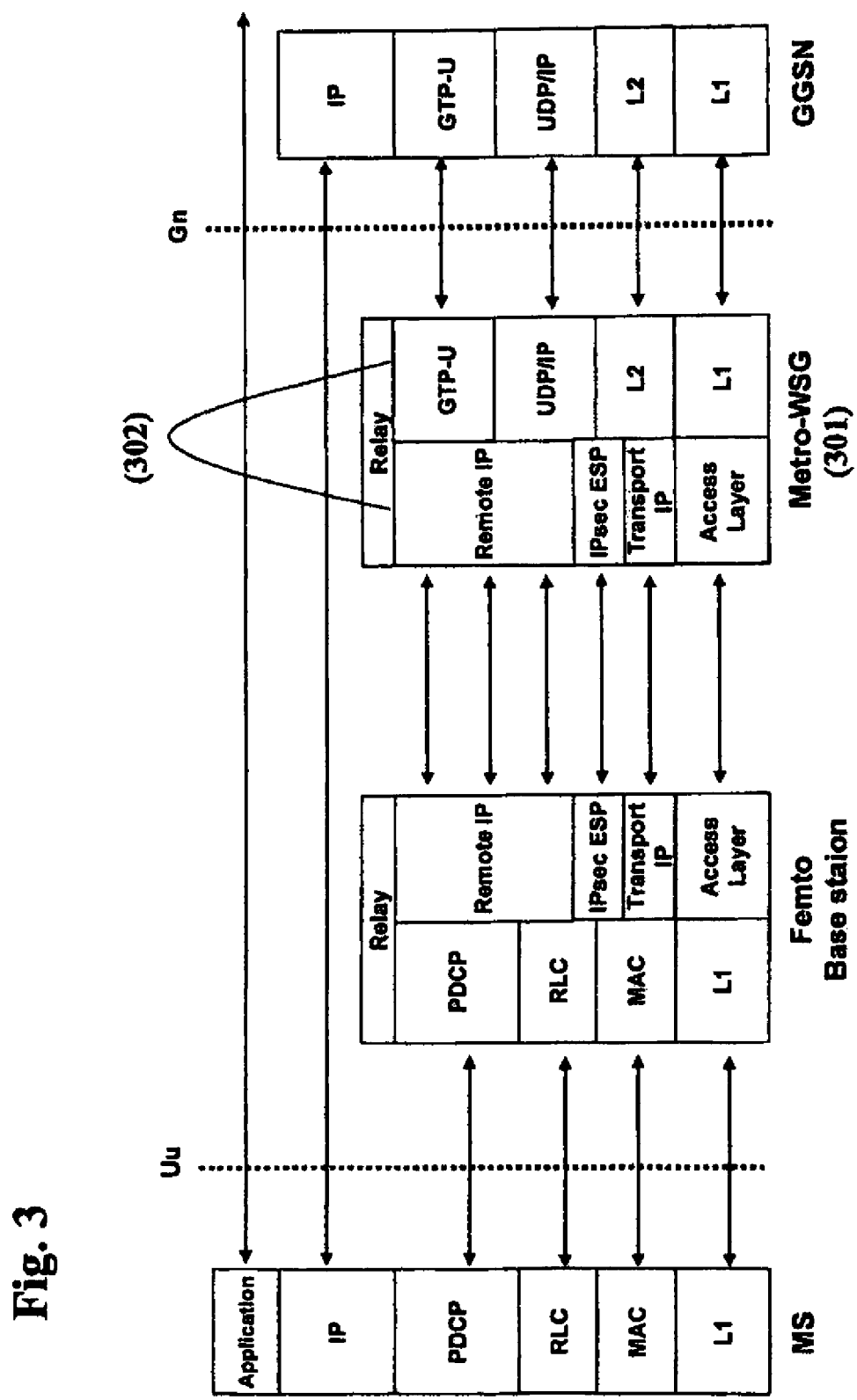
FIG. 3 shows the protocol stack of a preferred embodiment of the proposed architecture.

FIG. 3 shows the user plane protocol stack of a preferred embodiment of the proposed architecture. In the preferred embodiment, the Metro-WSG (301) plays the role of Tunnel Terminating Gateway (TTG). It terminates the IPsec from the femtocell base station and sends the traffic encapsulated in GTP (302) over Gn to GGSN. The protocol stack in FIG. 3 is almost the same as the protocol stack in FIG. 2, except that there is no GTP-U between the femtocell base station and the Metro-WSG, i.e. the Iu-PS is not needed. The femtocell base station in the disclosed inventions only needs to extract the IP payload and sends it to the Metro-WSG over IPsec.

In the disclosed mechanisms, the femtocell base station carries only IP payload, thus relieving the femtocell base station of the burden to support GTP and also providing a more efficient way to handle data packets. This approach reduces the workload burdening the femtocell base station and re-uses the existing functionality of TTG. It is a step further advanced towards the all-IP femtocell architecture.

Figure 4:
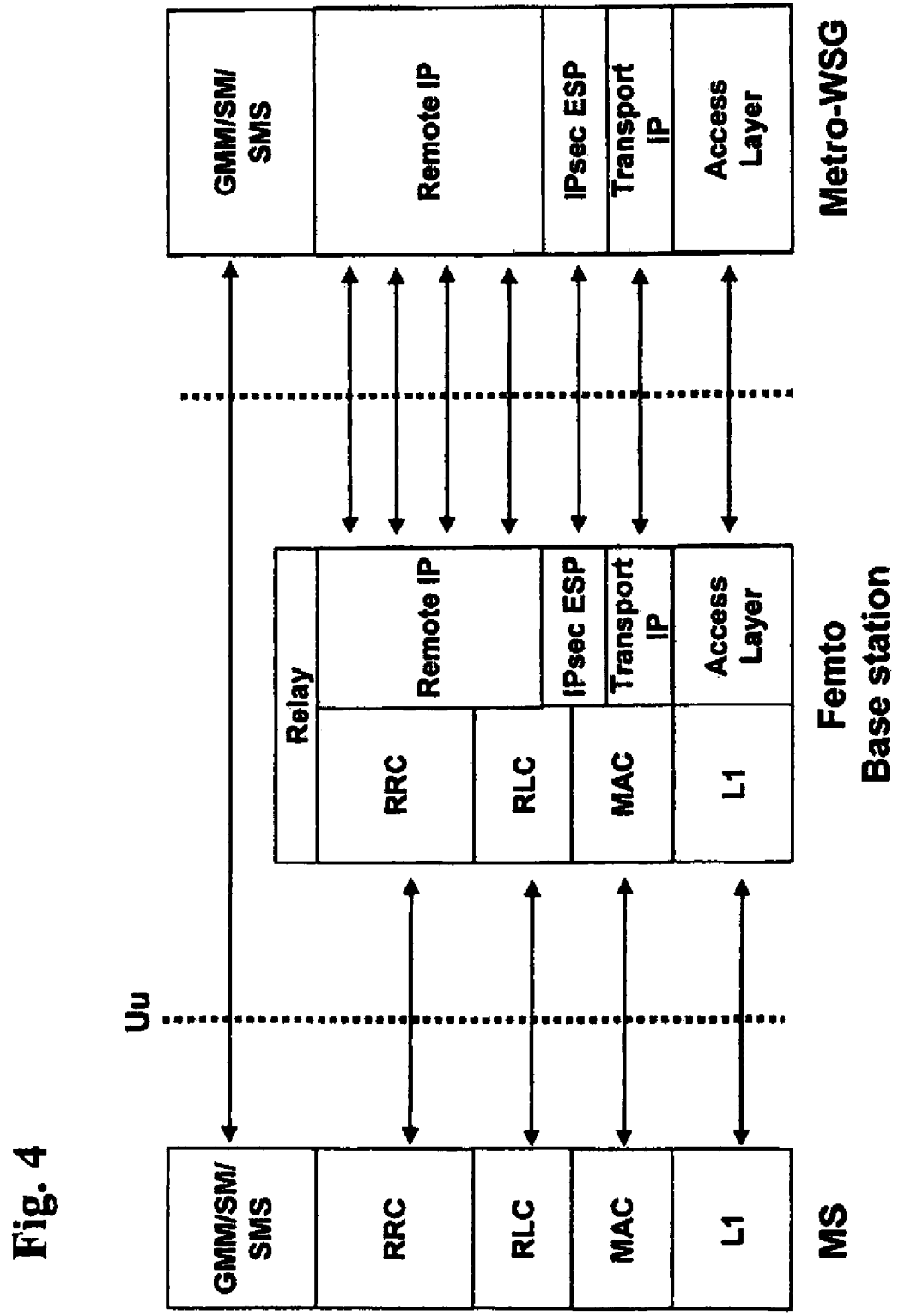
FIG. 4 shows the protocol stack of a control plane of the disclosed architecture.

FIG. 4 shows the protocol stack of a control plane of the disclosed architecture. In the preferred embodiment, the control plane payload is sent to the Metro-WSG inside IPsec, in the same way as data traffic is handled. The Metro-WSG terminates the NAS signaling, however this is transparent to the UE since Metro-WSG is in a way emulating SGSN functionality for NAS signaling termination. The Metro-WSG supports the NAS signaling. SM (session management) is used to create the PDP context towards the GGSN. GMM (GPRS mobility management) is used for moving across femtocell and macro cell. Standards-based inter-SGSN handover is performed when a user is moving across femtocell and macro cell. And from the femtocell base station point of view, it treats control traffic the same way as it treats data traffic.

According to various embodiments, there is provided:

MODIFICATIONS AND VARIATIONS OF THE INVENTION

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The claims as filed are intended to be as comprehensive as possible, and no subject matter is intentionally relinquished, dedicated, or abandoned.

What is claimed is:

1. A radio access network, comprising:
   a femtocell base station; and
   a wireless gateway;
   wherein data payload between said femtocell base station and said gateway is transmitted directly over IPsec, without the support of GTP as defined over Iu-ps, and said femtocell base station handles control traffic in substantially the same way as it handles data traffic.

2. The network of claim 1, wherein said gateway has the TTG (tunnel terminating gateway) functionality to route the payload to GGSN.

3. The network of claim 1, wherein said femtocell station relays voice traffic from a user equipment over a Iu-CS interface to said gateway.

4. The network of claim 1, wherein said femtocell station handles voice traffic from a user equipment the same way as 3G voice services and without CC to SIP translation function.

5. The network of claim 1, wherein said gateway forwards Iu-CS traffic from said femtocell station to a Mobile Switching Center.

6. The network of claim 1, wherein said femtocell station terminates Uu radio interface signaling from a wireless handset and strips IP payload to be sent to said gateway directly inside a IPsec, instead of encapsulating it inside a Iu-PS and sending it inside IPsec.

7. The network of claim 1, wherein said gateway, upon receipt of an IP payload from said femtocell station, encapsulates said payload to send over a Gn interface to a GGSN.

8. The method of claim 1, wherein said gateway routes said data payload from said femtocell station directly to a destination public data network without encapsulation.

* * * * *

UNITED STATES PATENT AND TRADEMARK OFFICE
CERTIFICATE OF CORRECTION

Page 1 of 1

PATENT NO. : 8,576,781 B2
APPLICATION NO. : 13/371331
DATED : November 5, 2013
INVENTOR(S) : Heeseon Lim and Nishi Kant It is certified that error appears in the above-identified patent and that said Letters Patent is hereby corrected as shown below:

In the Specification

Column 1, line 6 the claim of priority to US 60/979,795 was mistakenly left off of the "cross reference to related applications" section. Please replace the specification paragraph [0001] to read:

-- This application is a continuation of, and claims priority to US Patent Application No. 12/250,947 filed on October 14, 2008 now U.S. Patent No. 8,116,264; which claims priority to US Provisional Application No. 60/979,795 filed on October 12, 2007; which is hereby incorporated by reference in its entirety. --

Signed and Sealed this
Thirty-first Day of December, 2013

Margaret A. Focarino
*Commissioner for Patents of the United States Patent and Trademark Office*